United States Patent
Tsai et al.

(10) Patent No.: US 9,496,564 B2
(45) Date of Patent: Nov. 15, 2016

(54) METHOD FOR FABRICATING METAL ELECTRODE FROM SEAWATER AND GENERATING ELECTRIC POWER WITH METAL ELECTRODE

(71) Applicant: Taiwan Carbon Nanotube Technology Corporation, Miaoli County (TW)

(72) Inventors: Chun-Hsien Tsai, Miaoli County (TW); Kuang-Che Lee, Miaoli County (TW); Chun-Jung Tsai, Miaoli County (TW); Ting-Chuan Lee, Miaoli County (TW); Yuan-Shin Huang, Miaoli County (TW)

(73) Assignee: TAIWAN CARBON NANO TECHNOLOGY CORPORATION, Zhunan Township, Miaoli County (TW)

( * ) Notice: Subject to any disclaimer, the term of this patent is extended or adjusted under 35 U.S.C. 154(b) by 91 days.

(21) Appl. No.: 14/625,066

(22) Filed: Feb. 18, 2015

(65) Prior Publication Data

US 2016/0172689 A1 Jun. 16, 2016

(30) Foreign Application Priority Data

Dec. 12, 2014 (TW) .............................. 103143441 A

(51) Int. Cl.
*H01M 8/04007* (2016.01)
*H01M 8/18* (2006.01)
*H01M 8/04* (2016.01)
*H01M 8/20* (2006.01)

(52) U.S. Cl.
CPC ......... *H01M 8/04007* (2013.01); *H01M 8/188* (2013.01); *H01M 8/20* (2013.01)

(58) Field of Classification Search
None
See application file for complete search history.

(56) References Cited

U.S. PATENT DOCUMENTS

| | | |
|---|---|---|
| 2013/0121449 A1 | 5/2013 | Popa-Simil |
| 2014/0013746 A1 | 1/2014 | Kimura et al. |

Primary Examiner — Yoshitoshi Takeuchi
(74) Attorney, Agent, or Firm — Muncy, Geissler, Olds & Lowe, P.C.

(57) ABSTRACT

A method for fabricating a metal electrode from seawater and generating electric power with the metal electrode comprises steps: using a seawater treatment apparatus to heat seawater to a first temperature of 100-120° C. to obtain concentrated seawater; guiding the concentrated seawater to a precipitation apparatus, and adding a precipitation agent to the concentrated seawater to obtain a first crystalline material comprising magnesium hydroxide; heating the first crystalline material to a second temperature of 600-1100° C. to obtain a second crystalline material comprising magnesium oxide; transporting the second crystalline material to a separation apparatus, adding a reducing agent to the second crystalline material, heating the second crystalline material to a third temperature of 1200-2400° C. to obtain magnesium metal; and using the metal magnesium as a first electrode, and letting an electrolyte react with the first electrode and a second electrode to form electrochemical reactions and output electric power.

6 Claims, 1 Drawing Sheet

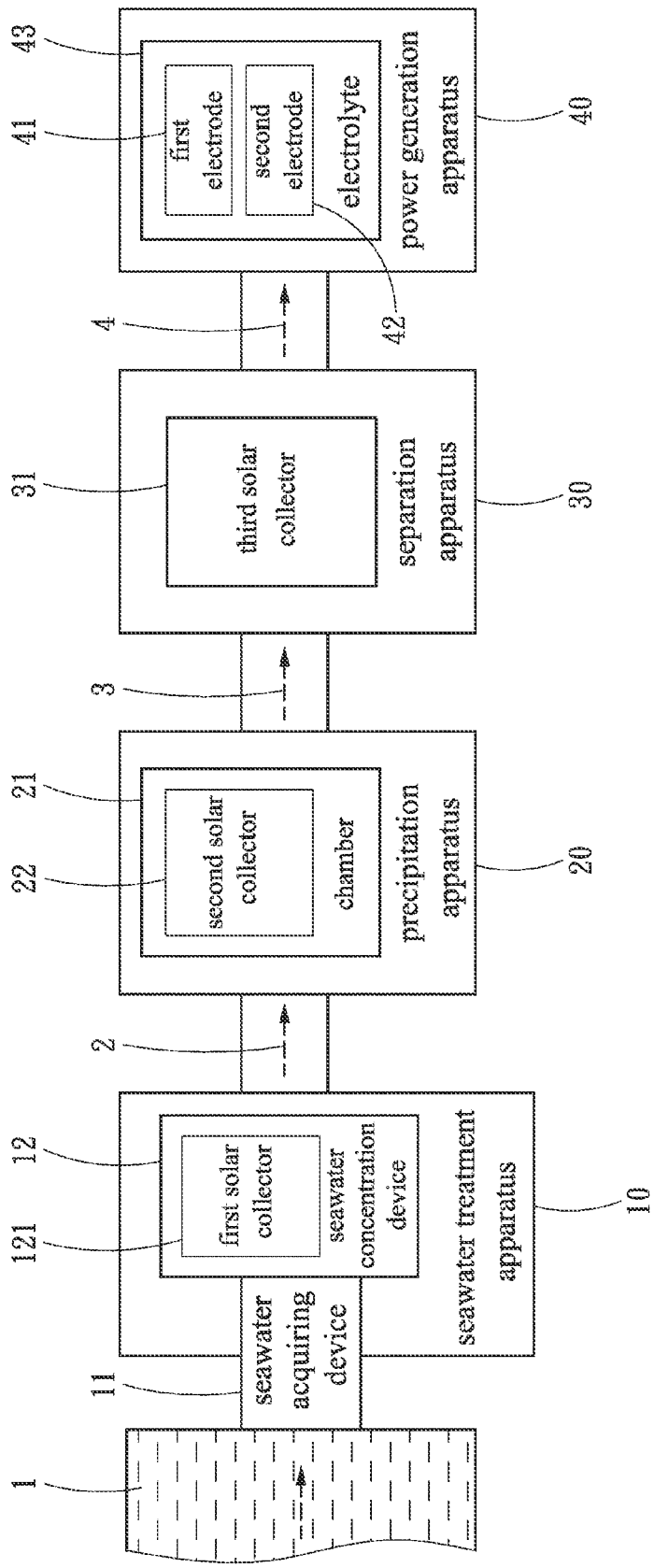

METHOD FOR FABRICATING METAL ELECTRODE FROM SEAWATER AND GENERATING ELECTRIC POWER WITH METAL ELECTRODE

FIELD OF THE INVENTION

The present invention relates to a power generation method, particularly to a method for fabricating a metal electrode from seawater and generating electric power with the metal electrode.

BACKGROUND OF THE INVENTION

With population growth, industrialization and urbanization, energy consumption has increased fast in recent years, and energy shortage becomes an imminent problem. Nuclear power plants used in many advanced countries have brought about the problems of thermal pollution and nuclear waste. Owing to exhausted energy resources and environmental protectionism, many nations have paid attention to research and utilization of green energy, and numerous researchers have been devoted to developing new energy sources to replace fossil fuels.

The conventional thermal power plants use thermal energy generated by fossil fuels, such as coal, petroleum and natural gas, to convert water into steam, and the steam drives a gas turbine to operate. Then, the gas turbine further drives a power generator to generate electric power. A US patent publication No. 20140013746 may exemplify the conventional technology. The conventional nuclear power plants use uranium-235 as nuclear fuel, which undergoes nuclear fission inside a nuclear reactor and releases a great amount of thermal energy. Next, high-pressure circulating cooling water absorbs the thermal energy and becomes steam in a steam generator. Next, the high-temperature and high-pressure steam drives a gas turbine to operate. Then, the gas turbine further drives a power generator to generate electric power. A US patent publication No. 20130121449 may exemplify the conventional technology.

However, the fossil fuel-based thermal power plants would generate waste heat, carbon dioxide, sulfur dioxide, suspended particulates, etc. and cause air pollution. Besides, the reserve of fossil fuels is not unlimited but will be exhausted one day. The reactors of nuclear power plants carry a great amount of radioactive materials, which will become nuclear waste after the depletion of the nuclear fuel. Besides, nuclear power plants cause more serious thermal pollution. Therefore, developing power generation technologies meeting the demands of green energy and environmental protection is an urgent mission for governments and researchers.

SUMMARY OF THE INVENTION

The primary objective of the present invention is to solve the air pollution problem caused by the conventional thermal power plants using fossil fuel and the nuclear waste treatment problem caused by the conventional nuclear power plants.

In order to achieve the abovementioned problems, the present invention proposes a method for fabricating a metal electrode from seawater and generating electric power with the metal electrode, which comprises Step 1: providing a power generation system neighboring a sea, which includes a seawater treatment apparatus with a first solar collector, a precipitation apparatus with a second solar collector, a separation apparatus with a third solar collector, and a power generation apparatus, wherein the power generation apparatus includes a first electrode carrier, a second electrode comprising a carbon material and arranged opposite the first electrode carrier, and an electrolyte;

Step 2: obtaining seawater from the sea, guiding the seawater to the seawater treatment apparatus, and heating the seawater to a first temperature ranging from 100 to 120° C. to obtain concentrated seawater;

Step 3: guiding the concentrated seawater to the precipitation apparatus, and adding a precipitation agent to the concentrated seawater to obtain a first crystalline material comprising magnesium hydroxide ($Mg(OH)_2$);

Step 4: heating the first crystalline material to a second temperature ranging from 600 to 1100° C. to remove water from the first crystalline material and convert the first crystalline material into a second crystalline material comprising magnesium oxide;

Step 5: transporting the second crystalline material to the separation apparatus, adding a reducing agent to the second crystalline material, heating the second crystalline material to a third temperature ranging from 1200 to 2400° C. to convert the second crystalline material into magnesium metal; and Step 6: transporting the metal magnesium to the power generation apparatus, wherein the metal magnesium is arranged on the first electrode carrier to function as a first electrode, and wherein the first electrode and the second electrode react with the electrolyte to form electrochemical reactions, which generate an electric potential drop between the first electrode and the second electrode and output electric power.

In one embodiment, the heating processes in Step 2, Step 4 and Step 5 are undertaken under a normal atmospheric pressure.

In one embodiment, the precipitation agent used in Step 3 is selected from a group consisting of calcium hydroxide, calcium carbonate, and calcium oxide. In one embodiment, the reducing agent used in Step 5 is selected from a group consisting of silicon, iron, chromium, carbon, and calcium carbide. In one embodiment, the carbon material used in Step 6 is selected from a group consisting of carbon nanotube, graphite, carbon fiber, and carbon black.

In one embodiment, the power generation apparatus is electrically connected with an electric storage module, wherein the electric storage module receives and stores the electric power output in Step 6, whereby the electric power can be used later on and the utilization efficiency thereof is promoted.

Therefore, the present invention has the following advantages:

1. The present invention is an environmental-protection power generation method, neither using fossil fuel nor using nuclear fuel, exempted from the problems of air pollution and nuclear waste treatment;
2. The resource used by the present invention is seawater having abundant reserve and stable supply in comparison with other resources, such as fossil fuel and nuclear fuel; seawater can be persistently supplied to the seawater power generation system to continuously generate magnesium metal as the first electrode, wherefore the present invention is exempted from shortage of power generation resource.

BRIEF DESCRIPTION OF THE DRAWINGS

FIG. 1 is a diagram schematically showing the process of and the apparatuses used by a method for fabricating a metal electrode from seawater and generating electric power with the metal electrode according to one embodiment of the present invention.

DETAILED DESCRIPTION OF THE PREFERRED EMBODIMENTS

The technical contents of the present invention will be described in detail in cooperation with drawings below.

Refer to FIG. 1 a diagram schematically showing the process of and the apparatuses used by a method for fabricating a metal electrode from seawater and generating electric power with the metal electrode according to one embodiment of the present invention. The method of the present invention comprises Steps 1-6.

In Step 1, provide a power generation system neighboring a sea. For example, the power generation system is installed on the seashore neighboring a sea or an island surrounded by an ocean. The power generation system includes a seawater treatment apparatus 10 having a seawater acquiring device 11 and a seawater concentration device 12, a precipitation apparatus 20, a separation apparatus 30, and a power generation apparatus 40.

In Step 2, use the seawater acquiring device 11 of the seawater treatment apparatus 10 to obtain seawater 1 from the sea, wherein the seawater acquiring device 11 includes an input end reaching the sea, an output end opposite the input end, and a pump, and wherein the seawater 1 is pumped by the pump through the input end to the seawater acquiring device 11 and then flows out of the seawater acquiring device 11 through the output end to the seawater concentration device 12, and wherein the seawater concentration device 12 includes a first solar collector 121; use the first solar collector 121 to heat the seawater 1 to a first temperature ranging from 100 to 120° C. under a normal atmospheric pressure to evaporate a portion of water from the seawater 1 and obtain concentrated seawater 2.

In Step 3, guide the concentrated seawater 2 to the precipitation apparatus 20, wherein the precipitation apparatus 20 is connected with the seawater treatment apparatus 10 and includes a chamber having a first material tank and a second solar collector 22, and wherein the chamber 21 interconnects with the seawater concentration device 12 and receives the concentrated seawater 2 from the seawater concentration device 12; add a precipitation agent to the first material tank to obtain a first crystalline material comprising magnesium hydroxide ($Mg(OH)_2$). In one embodiment, the precipitation agent is selected from a group consisting of calcium hydroxide, calcium carbonate, and calcium oxide.

In Step 4, turn on the second solar collector 22 to heat the first crystalline material to a second temperature ranging from 600 to 1100° C. under a normal atmospheric pressure to generate a precipitation of a metal oxide 3, wherein the metal oxide 3 is a second crystalline material comprising magnesium oxide.

In Step 5, transport the second crystalline material to the separation apparatus 30, wherein the separation apparatus 30 includes a second material tank and a third solar collector 31; add a reducing agent to the second material tank; use the third solar collector 31 to heat the second crystalline material to a third temperature ranging from 1200 to 2400° C. to enable an redox reaction between the reducing agent and the second crystalline material and convert the second crystalline material into a metal 4. In one embodiment, the reducing agent is selected from a group consisting of silicon, iron, chromium, carbon, and calcium carbide. In one embodiment, carbon is used as the reducing agent and reduces magnesium oxide into magnesium metal.

In Step 6, transport the metal magnesium to the power generation apparatus 40, wherein the power generation apparatus 40 includes a first electrode 41, a second electrode 42 and an electrolyte 43, and wherein a first electrode carrier carries the metal magnesium to form the first electrode 41, and wherein the first electrode 41 and the second electrode 42 react with the electrolyte 43 to form electrochemical reactions, which generate an electric potential drop between the first electrode 41 and the second electrode 42 and output electric power. In one embodiment, the carbon material is selected from a group consisting of carbon nanotube, graphite, carbon fiber, carbon black and other types of carbon to function as the cathode. In one embodiment, the seawater 1 is directly adopted as the electrolyte 43. In other embodiments, a solution comprising cations and anions is used as the electrolyte 43.

During power generation in Step 6, an electrochemical reaction between the electrolyte 43 and the first electrode 41 and an electrochemical reaction between the electrolyte 43 and the second electrode 42 take place simultaneously. The electrochemical reaction between the electrolyte 43 and the first electrode 41 is

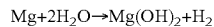

$$Mg+2H_2O \rightarrow Mg(OH)_2+H_2$$

and the electrochemical reaction between the electrolyte 43 and the second electrode 42 is

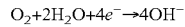

$$O_2+2H_2O+4e^- \rightarrow 4OH^-$$

Thus, a power generation loop is established via the reaction of the electrolyte 43 and the metal at the first electrode 41 and the simultaneous reaction of the electrolyte 43 and the gas at the second electrode 42. Thereby, an electric potential drop is persistently generated between the first electrode 41 and the second electrode 42 to continuously output electric power.

In one embodiment, each of the first solar collector 121, the second solar collector 22 and the third solar collector 31 respectively used in Step 2, Step 4 and Step 5 includes a plurality of planar reflectors, a heater, and a condenser lens focusing the sunlight reflected by the planar reflectors to the heater. In one embodiment, the power generation system used by the method of the present invention includes an electric storage module connected with the power generation apparatus 40. The electric storage module receives and stores the electric power output in Step 6, whereby the electric power can be used later on and the utilization efficiency thereof is promoted.

In conclusion, the present invention proposes a novel power generation method—a method for fabricating a metal electrode from seawater and generating electric power with the metal electrode. Through several steps of the present invention, a metal is fabricated from seawater to function as a first electrode of a power generation apparatus. The first electrode and a second electrode react with an electrolyte to output electric power. Seawater is an endless resource able to afford metal for the first electrode persistently. Therefore, the method of the present invention can continuously generate electric power, neither using fossil fuel nor using nuclear fuel, and exempted from the problems of air pollution and nuclear waste treatment. Hence, the present invention satisfies the demands of green power and environmental protection. Thus, the present invention possesses utility, novelty and non-obviousness and meets the condition for a patent. Accordingly, the Inventors file the application for a patent. It is appreciated if the patent is approved fast.

The present invention has been described in detail with the embodiments above. However, these embodiments are only to exemplify the present invention but not to limit the scope of the present invention. Any equivalent modification or variation according to the spirit of the present invention is to be also included within the scope of the present invention.

What is claimed is:

1. A method for fabricating a metal electrode from seawater and generating electric power with the metal electrode, comprising
    Step 1: providing a power generation system neighboring a sea, wherein the power generation system includes a seawater treatment apparatus with a first solar collector, a precipitation apparatus with a second solar collector, a separation apparatus with a third solar collector, and a power generation apparatus, and wherein the power generation apparatus includes a first electrode carrier, a second electrode arranged opposite the first electrode carrier and comprising a carbon material, and an electrolyte;
    Step 2: obtaining seawater from the sea, guiding the seawater to the seawater treatment apparatus, and heating the seawater to a first temperature ranging from 100 to 120° C. to obtain concentrated seawater;
    Step 3: guiding the concentrated seawater to the precipitation apparatus, and adding a precipitation agent to the concentrated seawater to obtain a first crystalline material comprising magnesium hydroxide ($Mg(OH)_2$);
    Step 4: heating the first crystalline material to a second temperature ranging from 600 to 1100° C. to remove water from the first crystalline material and convert the first crystalline material into a second crystalline material comprising magnesium oxide;
    Step 5: transporting the second crystalline material to the separation apparatus, adding a reducing agent to the second crystalline material, heating the second crystalline material to a third temperature ranging from 1200 to 2400° C. to convert the second crystalline material into magnesium metal; and
    Step 6: transporting the metal magnesium to the power generation apparatus, wherein the metal magnesium is arranged on the first electrode carrier to function as a first electrode, and wherein the first electrode and the second electrode react with the electrolyte to form electrochemical reactions, which generate an electric potential drop between the first electrode and the second electrode and output electric power.

2. The method for fabricating a metal electrode from seawater and generating electric power with the metal electrode according to claim 1, wherein heating processes in Step 2, Step 4 and Step 5 are undertaken under a normal atmospheric pressure.

3. The method for fabricating a metal electrode from seawater and generating electric power with the metal electrode according to claim 1, wherein the carbon material is selected from a group consisting of carbon nanotube, graphite, carbon fiber, and carbon black.

4. The method for fabricating a metal electrode from seawater and generating electric power with the metal electrode according to claim 1, wherein the precipitation agent is selected from a group consisting of calcium hydroxide, calcium carbonate, and calcium oxide.

5. The method for fabricating a metal electrode from seawater and generating electric power with the metal electrode according to claim 1, wherein the reducing agent is selected from a group consisting of silicon, iron, chromium, carbon, and calcium carbide.

6. The method for fabricating a metal electrode from seawater and generating electric power with the metal electrode according to claim 1, wherein the power generation system includes an electric storage module receiving and storing the electric power output in Step 6.

* * * * *